Sept. 2, 1941.  M. O. PERRY  2,254,309

WELDING TRANSFORMER

Filed Sept. 5, 1939  2 Sheets-Sheet 1

Inventor
Marlan O Perry
By Philip A Driedell
Attorney

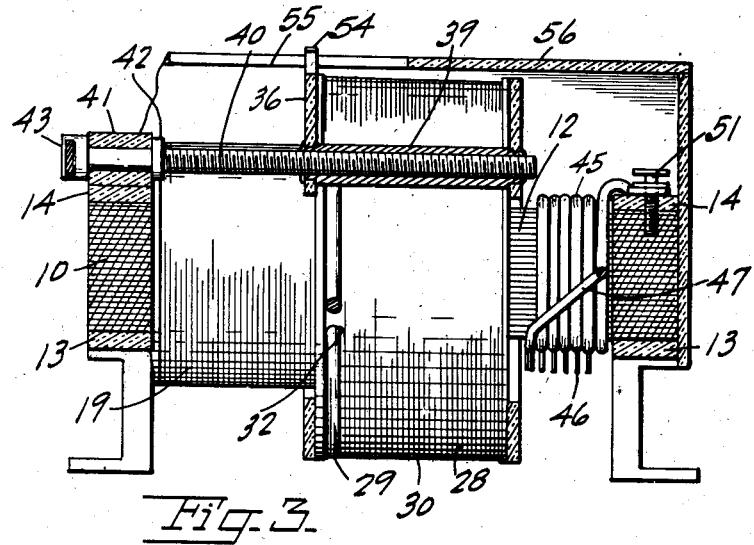

Patented Sept. 2, 1941

2,254,309

UNITED STATES PATENT OFFICE 2,254,309

WELDING TRANSFORMER

Marlan O. Perry, Stockton, Calif.

Application September 5, 1939, Serial No. 293,330

11 Claims. (Cl. 171—119)

This invention, a welding transformer, is adapted to either, arc- or spot-welding operations, and provides a balanced and dependable unit of unusually high efficiency and safety, with lower voltage requirements for arc welding, and adjustable as to the specific degree of heat desired, and automatically balancing that heat irrespective of ordinary fluctuations in load.

The objects and advantages of the invention are as follows:

First; to provide a transformer for arc welding in which the required open-circuit voltage for efficient operation is reduced to a maximum of about 65% of that ordinarily required in conventional types of welding transformers, while coincidently providing a better balanced circuit resulting in a smoother arc.

Second; to provide a transformer as outlined with a closed magnetic field with twin coils wired in parallel and mounted on the respective legs of the field, with the twin coils exactly balanced as to inductance and impedance.

Third; to provide twin secondaries on the respective legs, wired in parallel and axially adjustable relative to the twin coils forming the primaries, to provide precision adjustment within the heat range.

Fourth; to provide twin reactance coils on the respective legs wired in parallel with one terminal grounded and the other terminal in series with the neutral terminal of the secondary coils, for controlling the potential and balancing the output, resulting in easier starting of the arc, and with which arrangement, voltages in excess of 60 on open circuit are unnecessary for efficient operation, resulting in an unusually high degree of safety.

Fifth; to provide a transformer as outlined in which the secondary coils are guided and supported to accurately space the secondaries relative to the primaries irrespective of the adjusted position of the secondaries, thus assuring a balanced condition under all loads.

In describing the invention, reference will be made to the accompanying drawings in which:

Fig. 3 is a side sectional elevation taken on line 3—3 of Fig. 1.

Fig. 4 is a fragmentary view of the shield or housing showing the heat indicating means or adjusted position of the secondaries.

Fig. 5 is a wiring diagram of the invention.

Figure 1:
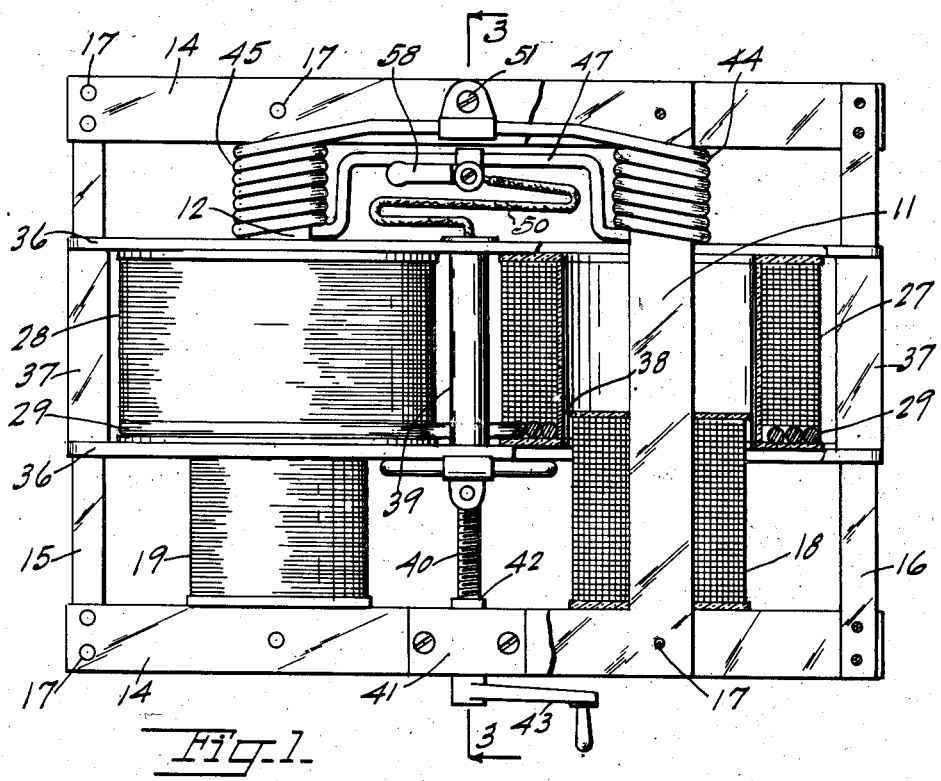
Fig. 1 is a plan view of the invention with the shield or housing removed.
Figure 2:
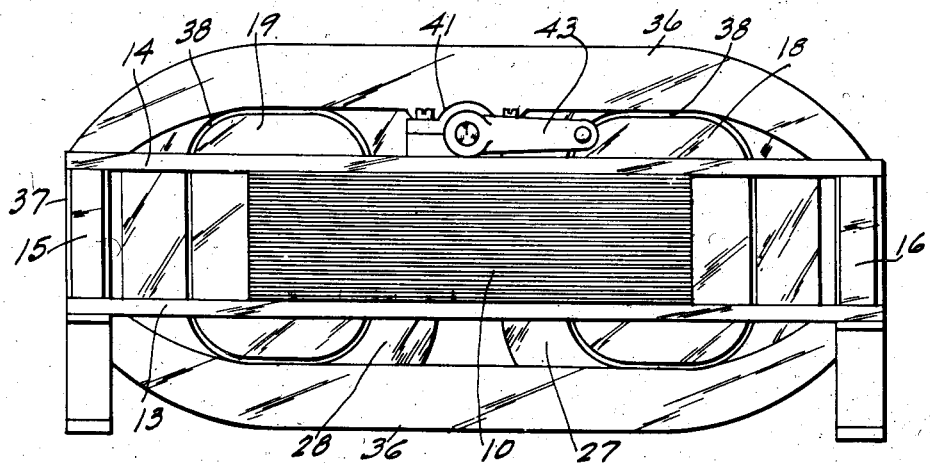
Fig. 2 is a front elevation of Fig. 1.

The invention includes a closed magnetic circuit consisting of a laminated core 10 having two legs 11 and 12 and suitably supported in a frame of non-magnetic material preferably, such as insulation, and which as illustrated consists of cross-members 13 and 14 separated by the main supporting beams 15 and 16, which coincidently form slide bars for adjustably supporting the assembly of secondaries, the various portions of the frame being suitably secured together as by means of bolts or rivets 17.

The core is formed of stampings, the L-type being well suited, and which type and others are well known in the art.

Non-adjustably mounted on the respective legs 11 and 12 are two primary coils 18 and 19, which are electrically balanced, and these coils are connected in parallel through wires 20 and 21 to one side 22 of a source of potential, and through wires 23, 24 and 25 to the other side 26 of the said source.

A pair of twin secondaries 27 and 28 are also connected in parallel and each consists of a compound winding including a spot-welding winding 29 of one or several turns of heavy wire to carry high amperage, and an arc-welding winding 30 of a multiplicity of turns of finer wire, and tapped at the junction of the two windings as indicated at 31 and 32 with the terminals 33 and 34 of these windings arranged with selective taps as indicated by the switch 35.

These secondaries are supported by a saddle 36 which terminates at each end in a shoe or sleeve 37 riding on the rails 15 and 16, creating perfect alignment with the primary coils 18 and 19. As will be noted, the secondary coils are formed as rings to slide over the primaries as indicated by the gap 38, and this saddle and its guides maintains uniformity of this gap.

Supported by this saddle is a threaded element 39 with which a screw 40 cooperates, and this screw has one end mounted in a bearing 41 and has the thrust collars 42 and a hand lever or crank 43 which maintain the screw in relative position against longitudinal movement. Manual operation of the crank 43 will move the two secondaries simultaneously more or less into the direct field of the primaries, thus controlling the amperage and consequently the heat of the weld.

Mounted on the respective legs 11 and 12 are two inductive reactances 44 and 45 which are also connected in parallel and provided with taps 46 for accurate control of potential for arc welding, the arm 47 being indicated as connected to the last tap to include the complete reactances in the circuit.

The parallel reactance coils 44 and 45 are connected in series with the secondaries 29 and 30 through the intermediate taps 31 and 32 and wires 48, 49 and 50, thence to ground at 51.

For arc welding operations, the tap 52 is taken off the terminals 34, while for spot welding operations the terminals 33 are used, the other tap 53 being taken to ground, as to the core 10.

A heat indicator is included and may consist of any suitable form which can be operated by the movable coil, and the form illustrated consists of a pointer 54 attached to the saddle and extending through a slot 55 formed in the shield or housing 56 and cooperatively related to a series of graduations 57 through the medium of which the relative heat is indicated, and by which adjustment can be made for the specific degree of heat desired.

For spot welding or butt welding operations it may be desirable to eliminate the reactances from the welding circuit, for which purpose a short-circuiting switch or tap 58 is provided and which acts to connect the secondary directly to ground. Thus the transformer is quickly convertible for arc or spot welding and a balanced internal circuit is provided.

This transformer is adaptable for either of two potentials having ratios of 1:2, the primaries being connected in parallel for the lower potential and in series for the higher potential.

Also, either the primary or the secondary may be made the adjustable element, the disclosure presenting the secondary as the movable element since it provides the safest and most convenient adjustment, and, furthermore, the connection between the reactance coils and the secondaries and ground can be reversed to convert the reactance coils into booster coils to provide a step-up in potential, the reactance coils functioning to balance the performance to provide highly efficient operation.

It will be understood that variations in construction and arrangement of parts, which variations are consistent with the appended claims, may be resorted to without detracting from the spirit or scope of the invention, or sacrificing any of the advantages thereof.

I claim:

1. A welding system comprising a source of potential; a closed-circuit magnetizable core having parallel legs; primary windings connected in parallel to said source of potential and mounted on the respective legs; secondary coils telescopically adjustable relative to said primary windings and connected in parallel; reactance coils connected in parallel and mounted on the respective legs; said secondary coils and said reactance coils having their parallel connections connected in series and provided with terminals for connection to a load.

2. A structure as defined in claim 1 in which secondary coils consist each of a high-amperage winding for low voltage, and a lower amperage higher voltage winding, with the windings connected in series and tapped at the point of juncture for selective connection in parallel of the secondary coils.

3. A structure as defined in claim 1 in which each reactance coil is provided with taps for adjusting the reactance in accordance with requirements and in which a switch is included for short circuiting the parallel connections of the reactance coils.

4. A structure as defined in claim 1 in which said transformer includes a frame and rails; a saddle slidably supported on said rails and supporting said secondary coils; and a threaded element manually operable and cooperating between said saddle and said frame for adjusting said secondary coils relative to said primary windings.

5. A structure as defined in claim 1, and a heat-value indicator associated with and adjusted through adjustment of said secondary coils and a graduated scale for said indicator, said indicator indicating the heat in terms of relative adjustment of the secondary coils.

6. A structure as defined in claim 1 in which said secondary coils consist each of a plurality of windings in connected series and tapped at the points of junction of the windings for selective connection of the secondary coils in parallel; selective parallel terminal connections for the windings; and in which said reactance coils are tapped for adjusting the reactance in accordance with requirements, and in which means is included for eliminating the reactance coils from the circuit.

7. A structure as defined in claim 1 in which said secondary coils consist each of two windings in series and tapped at the junction of the windings and with the tapped junctions of the secondary coils connected in parallel and with the respective terminals of the secondary coils selectively connectable in parallel, and in which said transformer includes a frame and associated rails; a saddle slidably supported on said rails and supporting said secondary coils; and a threaded element manually operable and cooperating with said frame and with said saddle for adjusting said secondary coils relative to said primary windings.

8. A structure as defined in claim 1 in which said secondary coils consist each of two windings in series and tapped at the junction of the windings to form one terminal and with the respective other terminals of the two coils selectively connectable in parallel; and a heat-value indicator associated with said secondary coils and adjustable therewith and a graduated scale for said indicator and indicating the heat in terms of relative adjustment of the secondary coils.

9. A welding system comprising; a frame; a closed magnetic circuit including two parallel core legs supported by said frame; a primary winding on each leg with the windings connected in parallel; a reactance coil on each leg and means for adjusting the reactance thereof, and parallel connections therefor; a pair of secondary coils telescoping over said primary windings and having their terminals connected in parallel, and with the parallel connections of the secondary coils connected in series with the parallel connections of the reactance coils; and means manually operable for telescopically adjusting said secondary coils relative to said primary windings.

10. A structure as defined in claim 9 in which said frame includes parallel slide bars; a saddle slidable on said bars and supporting said secondary coils and peripherally spacing them internally relative to the external periphery of the primary windings; a nut carried by said saddle, and a screw rotatably supported by said frame and cooperating with said nut, and a crank for said screw; said nut and screw forming the means manually operable for telescopically adjusting said secondary coils relative to said primary windings.

11. A welding system comprising; a source of electric potential; a frame; a saddle slidably supported by said frame; a closed-circuit magnetizable core having two parallel legs and supported by said frame; a primary winding fixedly mounted on each of said legs and connected in parallel to said source of potential; a pair of secondary coils respectively telescopically adjustable over said primary coils and carried by said saddle and having each an intermediate tap and opposite end terminals; means manually operable for adjusting said saddle to adjust said secondary coils relative to said primary windings; a reactance coil mounted on each of said legs and having terminals and intermediate taps and connected in parallel with one of its parallel connections forming a load terminal and with the other parallel connection connected in series with one parallel connection of said secondary coils; a manually-operable short-circuiting switch for the parallel connections of said reactance coils for coincidently connecting said one parallel connection of said secondary coils directly to said load terminal; and terminal connections for the intermediate taps and for the other terminals of said secondary coils, and a manually-operable switch for selectively connecting either said intermediate taps or said other terminals in parallel and connecting the parallel connection so made to form the other load terminal.

MARLAN O. PERRY.